(12) United States Patent
Dejaune et al.

(10) Patent No.: US 8,092,152 B2
(45) Date of Patent: Jan. 10, 2012

(54) DEVICE FOR COOLING SLOTS OF A TURBOMACHINE ROTOR DISK

(75) Inventors: Claude Gerard Rene Dejaune, Boissise la Bertrand (FR); Valerie Annie Gros, Grisy Suisnes (FR); Gael Loro, Combs la Ville (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 835 days.

(21) Appl. No.: 12/145,820

(22) Filed: Jun. 25, 2008

(65) Prior Publication Data

US 2009/0004006 A1    Jan. 1, 2009

(30) Foreign Application Priority Data

Jun. 27, 2007   (FR) ...................... 07 56065

(51) Int. Cl.
*F01D 5/08* (2006.01)
(52) U.S. Cl. ...................... 415/115; 415/175
(58) Field of Classification Search .................. 415/115, 415/175
See application file for complete search history.

(56) References Cited

U.S. PATENT DOCUMENTS

| | | | |
|---|---|---|---|
| 2,951,340 A | | 9/1960 | Howald |
| 5,232,339 A | * | 8/1993 | Plemmons et al. ........... 415/178 |
| 5,402,636 A | * | 4/1995 | Mize et al. ....................... 60/806 |
| 5,700,130 A | * | 12/1997 | Barbot et al. ................... 416/95 |
| 7,556,474 B2 | * | 7/2009 | Marchi .......................... 415/115 |

FOREIGN PATENT DOCUMENTS

| | | |
|---|---|---|
| EP | 1 264 964 A1 | 12/2002 |
| EP | 1 571 294 A1 | 9/2005 |

OTHER PUBLICATIONS

U.S. Appl. No. 12/143,284, filed Jun. 20, 2008, Dejaune, et al.
U.S. Appl. No. 12/145,820, filed Jun. 25, 2008, Dejaune, et al.

* cited by examiner

*Primary Examiner* — George Fourson, III
(74) *Attorney, Agent, or Firm* — Oblon, Spivak, McClelland, Maier & Neustadt, L.L.P.

(57) ABSTRACT

The invention relates to a device for cooling the slots of a turbomachine rotor disk, the device comprising a rotor disk having a plurality of slots and a flange that extends upstream from a radially upstream face of the disk. The device also comprises a retaining annulus having a flange that is placed around the flange of the disk, co-operating therewith to provide a space forming a cooling air diffusion cavity, said cavity opening out into the bottom of each of the slots of the disk, and a plurality of air admission orifices opening out into the diffusion cavity at the upstream end thereof, the cavity having means at its downstream end for reducing the flow rate of air penetrating into the slots of the disk that are situated radially in register with air admission orifices.

7 Claims, 3 Drawing Sheets

DEVICE FOR COOLING SLOTS OF A TURBOMACHINE ROTOR DISK

BACKGROUND OF THE INVENTION

The present invention relates to the general field of turbomachine rotor disks that are provided at their peripheries with slots in which blade roots are mounted. The invention relates more particularly to a device enabling such slots to be cooled effectively.

In known manner, the disks of a turbomachine rotor, such as the disks in the various stages of the low pressure turbine, include at their periphery a plurality of substantially axial slots into which the roots of moving blades of the turbine are engaged.

While the turbomachine is in operation, the flow section of the low pressure turbine in which the blades are disposed passes gas at a temperature that is very high. The slots in the disk that receive the blade roots are therefore directly exposed to the hot gas so it is necessary to cool them in order to avoid any damage to the disks.

For this purpose, it is known to take a fraction of the air that flows outside the flow section of the low pressure turbine and direct it via a cooling circuit to the slots in the rotor disks. In practice, each rotor disk has an annular flange that extends upstream from the upstream radial face of the disk and around which there is mounted a retaining annulus. The disk flange and the retaining annulus are disposed in such a manner as to form between them an annular space forming a cooling air diffusion cavity. This diffusion cavity is fed with cooling air at its upstream end via a plurality of orifices that are regularly distributed around the axis of rotation of the disk, and at its downstream end it opens out into the bottom of each of the slots in the disk. Air that flows outside the flow section of the turbine penetrates into the diffusion cavity of the cooling circuit via orifices, diffuses in said cavity, and then ventilates the slots in the disk in order to cool them.

Nevertheless, that type of cooling circuit does not enable completely uniform cooling to be obtained for all of the slots in the rotor disk, which is harmful for good operation of the disk, and thus for the lifetime of the disk. It will readily be understood that with such a configuration, the slots that are disposed directly in line with the air speed orifices of the cooling circuit are cooled considerably better than the slots that are angularly offset further away therefrom.

OBJECT AND SUMMARY OF THE INVENTION

The present invention seeks to remedy the above-mentioned drawbacks by proposing a device that enables the cooling of the slots in the rotor disk to be improved in order to increase its lifetime.

This object is achieved by means of a device for cooling the slots in a turbomachine rotor disk, the device comprising:
 a rotor disk comprising:
  at its periphery, a plurality of substantially axial slots that are regularly distributed around the axis of rotation of the disk; and
  an annular flange extending upstream from an upstream radial face of the disk;
 a retaining annulus mounted against the upstream radial face of the disk and including an annular flange that extends upstream and that is placed around the flange of the disk, co-operating therewith to leave an annular space forming a cooling air diffusion cavity, this diffusion cavity opening out at its downstream end into the bottom of each of the disk slots, at the upstream ends thereof; and
 a plurality of air admission orifices regularly distributed around the axis of the rotation of the disk and opening out into the diffusion cavity at the upstream end thereof;
 wherein the downstream end of the air diffusion cavity includes means for reducing the flow rate of air penetrating into the slots of the disk that are situated radially in register with the air admission orifices.

The term "slots situated radially in register with an air admission orifice" is used to mean the or each slot that lies in substantially the same radial plane as each orifice.

By reducing the flow rate of air penetrating into those slots of the rotor disk that are situated radially in register with air admission orifices, the flow rate of air penetrating into slots that are further away from the air admission orifices is necessarily increased. The quantity of cooling air admitted into each of the slots in the disk is thus substantially identical over the entire disk. As a result, cooling is completely uniform for all of the slots of the disk, thereby enabling the lifetime of the disk to be increased.

Preferably, the outer face of the flange of the disk, and/or the inner face of the flange of the retaining annulus presents a projection at its downstream end facing each slot of the disk that is situated radially in register with an air admission orifice, which projection projects into the air diffusion cavity in order to reduce the flow section of the air penetrating into said slots. For equal speeds, reducing the air flow section corresponds to reducing the flow rate of air penetrating into the slots.

According to an advantageous characteristic, each projection presents a maximum height facing the slots of the disk that are situated radially in register with the corresponding air admission orifice, such that the flow section for air thereat is at a minimum, and presents minimum heights halfway between the corresponding air admission orifice and the two orifices that are directly adjacent thereto, such that the flow sections for air thereat are at a maximum. As a result, the flow rate of air penetrating into slots that are situated radially in register with air admission orifices is decreased, while that penetrating into slots that are further away is increased.

According to another advantageous characteristic, the height of each projection decreases in substantially regular manner between its maximum height and its minimum heights. As a result, the flow rate of air penetrating into each slot can be well adapted to the angular position of the slot relative to the air admission orifices.

Each projection may present a profile that is substantially plane or substantially curvilinear. The retaining annulus may be fastened to the flange of the disk by means of bolted connections clamping their respective free ends together, the air admission orifices being disposed circumferentially between said bolted connections.

The invention also provides a turbomachine including at least one device for cooling the slots of a rotor disk, as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF EMBODIMENTS

Figure 1:
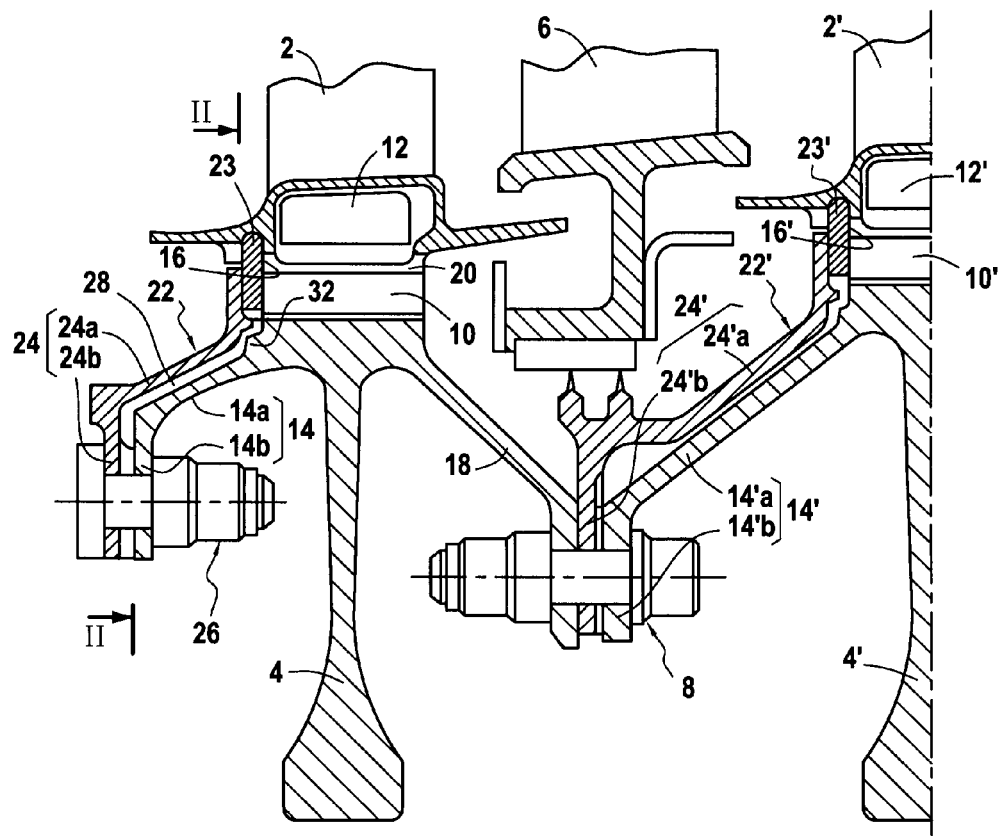
FIG. 1 is a fragmentary longitudinal section view of a low pressure turbine of a turbomachine that is fitted with a device constituting an embodiment of the invention.

FIG. 1 is a fragmentary longitudinal section view of a low pressure turbine of an aviation turbomachine fitted with a device constituting an embodiment of the invention.

Naturally, the present invention applies to any other turbomachine unit (aviation or terrestrial) that has a rotor disk with slots in which blade roots are mounted axially.

FIG. 1 shows more precisely the first stage and the second stage of the low pressure turbine. The first stage comprises a rotor wheel made up of a plurality of rotor blades 2 mounted axially on a rotor disk 4. The second stage comprises a nozzle made up of a plurality of stator vanes 6 and a rotor wheel placed behind the nozzle and formed by a plurality of rotor blades 2' mounted axially on a rotor disk 4'.

The rotor disks 4 and 4' of the first and second turbine states are centered on the longitudinal axis X-X of the turbomachine and are fixed to each other by bolted connections 8 that are regularly distributed around the axis X-X.

Each disk 4, 4' includes in its periphery a plurality of substantially axial slots 10, 10' that are open towards the outside of the disk and that are regularly distributed around the axis of rotation of the disks (this axis of rotation coincides with the longitudinal axis X-X of the turbomachine). Each slot is for axially receiving a respective root 12, 12' (e.g. fir-tree shaped) of a rotor blade 2, 2' (e.g. by interfitting).

Each disk 4, 4' also includes an annular flange 14, 14' that extends axially upstream from the radially upstream face 16, 16' of the disk. The flange 14, 14' is made up of a substantially axial annular portion 14a, 14'a that is extended by a substantially radial annular portion 14b, 14'b (referred to below as the upstream end of the disk flange).

The disk 4 of the first stage of the turbine also has an annular flange 18 extending axially downstream from the downstream radial face 20 of the disk. This flange 18 is used for fastening the disk 4 to the disk 4' of the second stage via bolted connections 8, as mentioned above.

A retaining annulus 22, 22' is mounted against the radially upstream face 16, 16' of each disk 4, 4' with interposition of an annular stop ring 23, 23'. Each retaining annulus 22, 22' comprises an annular flange 24, 24' that extends axially upstream and that is disposed around the corresponding flange 14, 14' of the disk.

More precisely, the flange 24, 24' of the retaining annulus is made up of an annular portion 24a, 24'a that is substantially axial, extended by an annular portion 24b, 24'b that is substantially radial (referred to below as the free end of the flange of the annulus).

The retaining annulus 22 of the first stage of the turbine is fastened to the flange 14 of the disk 4 via bolted connections 26 clamping together their respective free ends 24b, 14b. The retaining annulus 22' of the second stage is fastened to the flange 14' of the disk 4' by means of the bolted connections 8 for fastening together the disks 4, 4'.

For reasons of convenience, the description relates solely to the circuit for cooling the slots 10 in the disk 4 of the first stage of the turbine. Naturally, the circuit for cooling the slots 10' in the disk 4' of the second stage of the turbine is entirely analogous to the circuit of the first stage.

The flange 24 of the retaining annulus 22 is placed around the flange 14 of the disk in such a manner as to co-operate therewith to form an annular space 28 forming a cooling air diffusion cavity. This diffusion cavity 28 is essentially formed between the axial portions 24a, 14a of the respective flanges 24, 14 of the retaining annulus and of the disk.

The diffusion cavity 28 has its downstream end opening out into the bottom of each of the slots 10 in the disk 4, at the upstream ends of the slots. At its upstream end, the diffusion cavity is closed by tightening together the bolted connections 26 between the free ends 24b, 14b of the respective flanges 24, 14 of the retaining annulus and of the disk.

Furthermore, the diffusion cavity 28 is fed with a plurality of air admission orifices 30 that are regularly distributed around the longitudinal axis X-X and that open out into the upstream end of the diffusion cavity.

Figure 2:
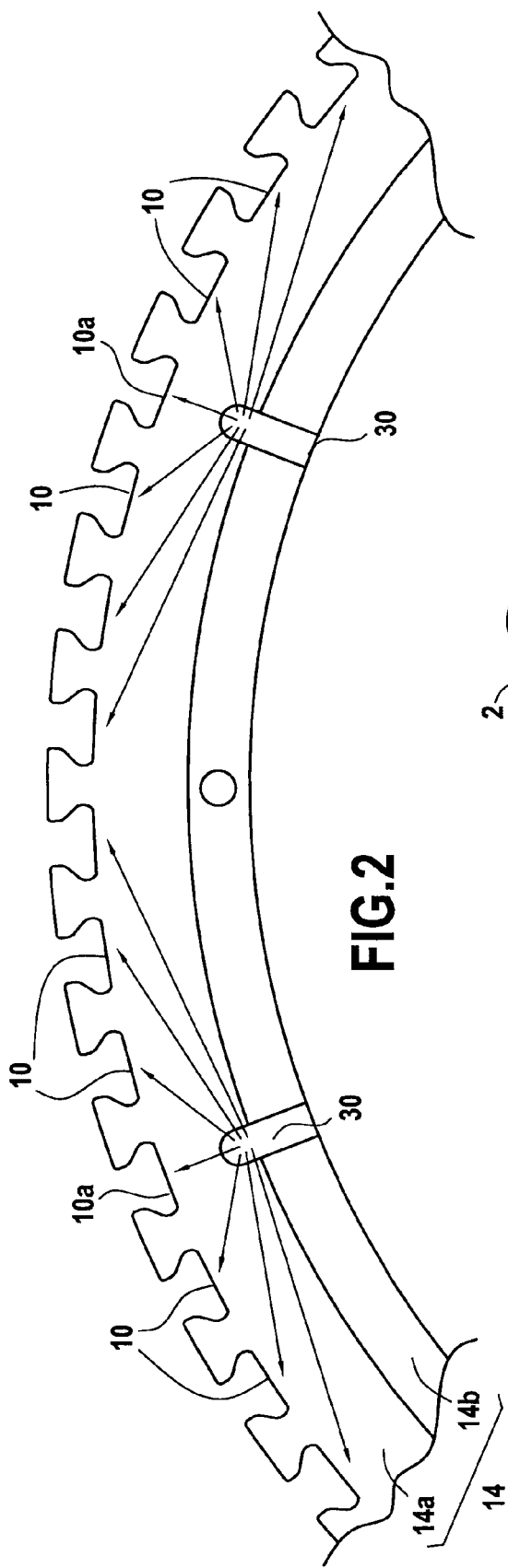
FIG. 2 is a section view on II-II of FIG. 1.

In the embodiment shown in FIG. 2, these air admission orifices 30 are formed by machining the free end 14b of the flange 14 of the disk 4 in a substantially radial direction. Naturally, these orifices could equally well be obtained by machining the free end 24b of the flange 24 of the retaining annulus 22.

Furthermore, the number of air admission orifices 30 over the disk as a whole can be varied. Thus, in the example of FIG. 2, the angular spacing between two adjacent air admission orifices 30 corresponds to about eight slots in the disk. Thus, each orifice 30 supplies cooling air for about seven slots as shown by the arrows in FIG. 2.

According to the invention, the air diffusion cavity 28 includes, at its downstream end, means for reducing the flow rate of air penetrating into the slots in the disk 4 that are situated radially in register with the air admission orifices 30.

The term "slots situated radially in register with an air admission orifice" is used to mean the or each slot that is disposed in substantially the same radial plane as each air admission orifice. Thus, in the example shown in FIG. 2, the slots referenced 10a correspond to the slots that are situated radially in register with each air admission orifice.

Figure 3:
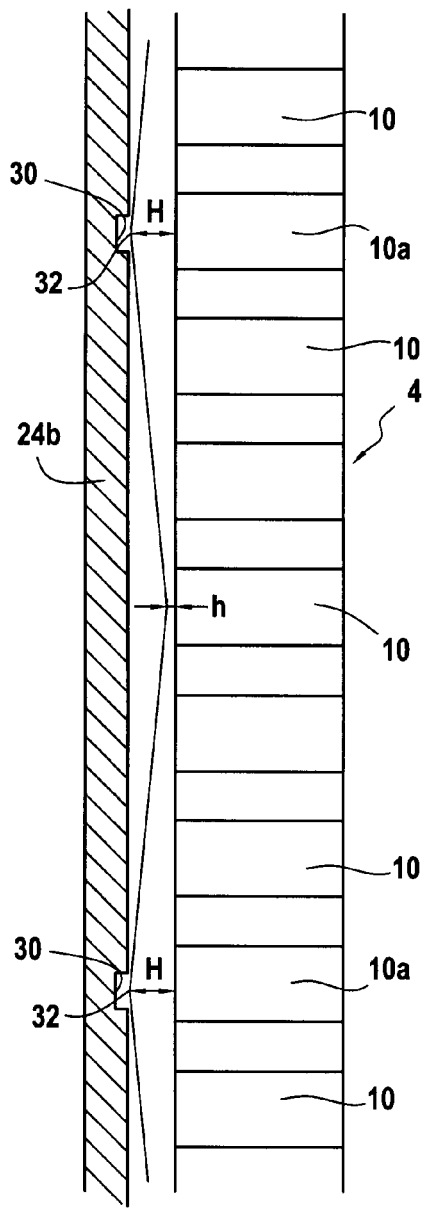
FIG. 3 is a diagrammatic and developed view of FIG. 2.

In an embodiment of these means as shown in FIGS. 1 to 3, the outer face of the axial portion 14a of the flange 14 of the disk presents a projection 32 at its downstream end (i.e. at the outlet from the diffusion cavity) and level with each slot 10a that is situated radially in register with an air admission orifice 30.

Such a projection 32 projects into the air diffusion cavity 28 and thus enables the flow section of the air penetrating into these slots 10a to be reduced.

The reduction in the flow section of the air leaving the diffusion cavity 28 and penetrating into the slots 10a that are situated radially in register with orifices 30 can be seen in particular in FIG. 3. At identical flow speeds, the air flow rate allocated to ventilating slots 10a situated radially in register with air admission orifices 30 is thus reduced, thereby having the natural consequence of increasing the air flow rate fed to the other slots in the disk. Since these other slots are further away from the air admission orifices, the path followed in order to feed them is longer. Nevertheless, the increase in the flow rate of air for cooling them serves to compensate for their remoteness and thus to make the cooling of the slots more uniform over the disk as a whole.

According to an advantageous characteristic shown in FIG. 3, each projection 32 presents a height (of penetration into the diffusion cavity) H that is at a maximum facing the slots 10a situated radially in register with a corresponding air admission orifice 30, and presents heights h that are at a minimum (or zero) angularly halfway between the corresponding air admission orifice and the two admission orifices that are directly adjacent thereto.

Thus, the flow section for air into the slots 10a situated radially in register with air admission orifices 30 is at a minimum, and the flow section for air angularly halfway between two adjacent air admission orifices is at a maximum. This corresponds exactly to the need to maximize the air flow rate for slots that are furthest away from the air admission orifices (i.e. the slots that are situated angularly halfway between two adjacent orifices).

Preferably, as shown in FIG. 3, each projection 32 decreases in substantially regular manner between its maximum height H and its minimum heights h. As a result, the flow rate of air penetrating into each slot of the disk can be well adapted to the angular position of the slot relative to the air admission orifices.

In the embodiment of the invention shown in FIGS. 1 to 3, each projection 32 presents a profile that is substantially plane (the surfaces forming the projections are substantially plane).

Figure 4:
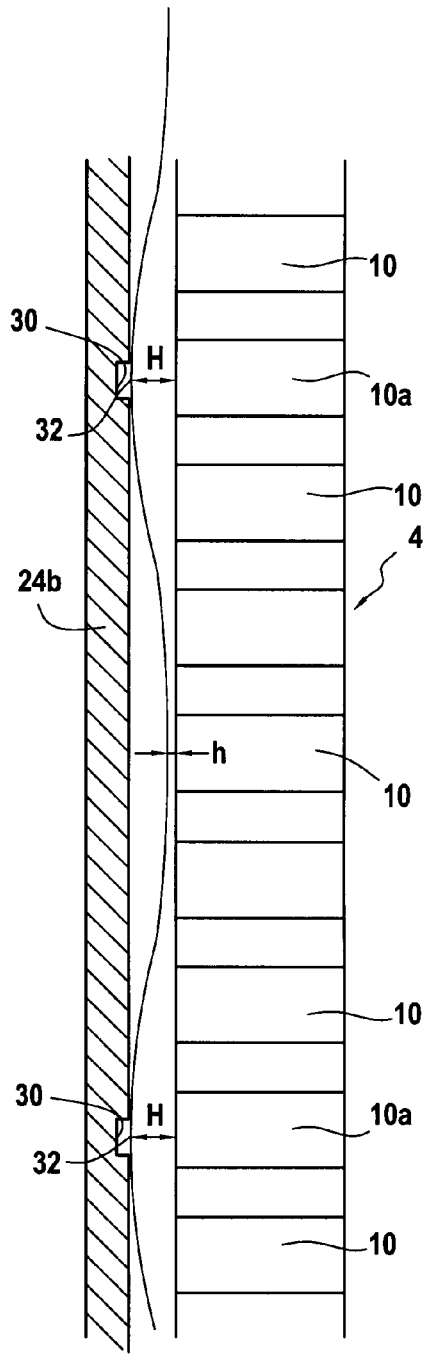
FIG. 4 is a fragmentary and developed view of a device constituting another embodiment of the invention.

Naturally, any other shape of profile could be envisaged. Thus, the profile of the projections 32 shown in FIG. 4 is curvilinear, and more precisely conical (it could also be cylindrical, etc.).

Furthermore, still in the embodiment of the invention shown in FIGS. 1 to 3, the projections 32 are formed on the outer face of the axial portion 14a of the flange 14 of the disk.

Figure 5:
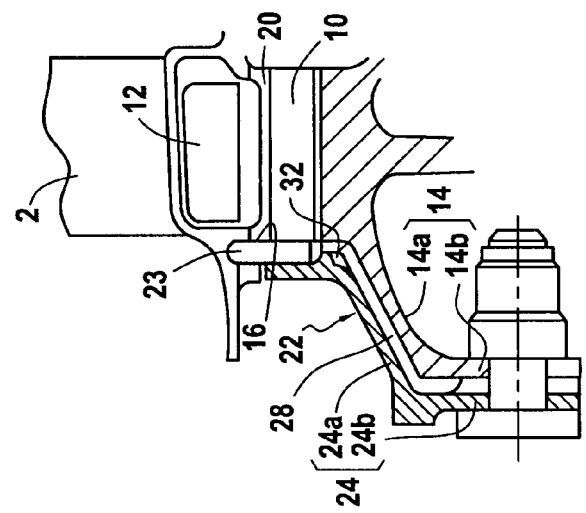
FIG. 5 is a longitudinal section view of a device constituting yet another embodiment of the invention.

Nevertheless, and as shown in FIG. 5, it is possible to envisage the projections 32 being formed instead on the inner face of the axial portion 24a of the flange 24 of the retaining annulus 22, these projections naturally likewise projecting into the diffusion cavity 28.

Another variant that is not shown in the figures consists in forming projections both on the outer face of the flange of the disk and also on the inner face of the flange of the retaining annulus.

Finally, it should be observed that regardless of the embodiment of the invention, the air admission orifices 30 are preferably disposed circumferentially between the bolted connections 26 fastening the retaining annulus 22 to the flange 14 of the disk 4.

What is claimed is:

1. A device for cooling the slots in a turbomachine rotor disk, the device comprising:
   a rotor disk comprising:
      at its periphery, a plurality of substantially axial slots that are regularly distributed around the axis of rotation of the disk; and
      an annular flange extending upstream from an upstream radial face of the disk;
   a retaining annulus mounted against the upstream radial face of the disk and including an annular flange that extends upstream and that is placed around the flange of the disk, co-operating therewith to leave an annular space forming a cooling air diffusion cavity, this diffusion cavity opening out at its downstream end into the bottom of each of the disk slots, at the upstream ends thereof; and
   a plurality of air admission orifices regularly distributed around the axis of the rotation of the disk and opening out into the diffusion cavity at the upstream end thereof;
   wherein the downstream end of the air diffusion cavity includes means for reducing the flow rate of air penetrating into the slots of the disk that are situated radially in register with the air admission orifices and for increasing the flow rate of air penetrating into the slots that are further away from the air admission orifices.

2. A device according to claim 1, in which the outer face of the flange of the disk, and/or the inner face of the flange of the retaining annulus presents a projection at its downstream end facing each slot of the disk that is situated radially in register with an air admission orifice, which projection projects into the air diffusion cavity in order to reduce the flow section of the air penetrating into said slots.

3. A device according to claim 2, in which each projection presents a maximum height facing the slots of the disk that are situated radially in register with the corresponding air admission orifice such that the flow section for air threat is at a minimum, and presents minimum heights halfway between the corresponding air admission orifice and the two orifices that are directly adjacent thereto, such that the flow sections for air threat are at a maximum.

4. A device according to claim 3, in which the height of each projection decreases in substantially regular manner between its maximum height and its minimum heights.

5. A device according to claim 2, in which each projection presents a profile that is substantially plane or substantially curvilinear.

6. A device according to claim 1, in which the retaining annulus is fastened to the flange of the disk by means of bolted connections clamping their respective free ends together, the air admission orifices being disposed circumferentially between said bolted connections.

7. A turbomachine, including at least one device for cooling the slots of a rotor disk according to claim 1.

* * * * *